June 21, 1960
N. E. LAUTERBACH
2,941,776
COUNTERBALANCING MECHANISM
Filed May 13, 1957
7 Sheets-Sheet 1
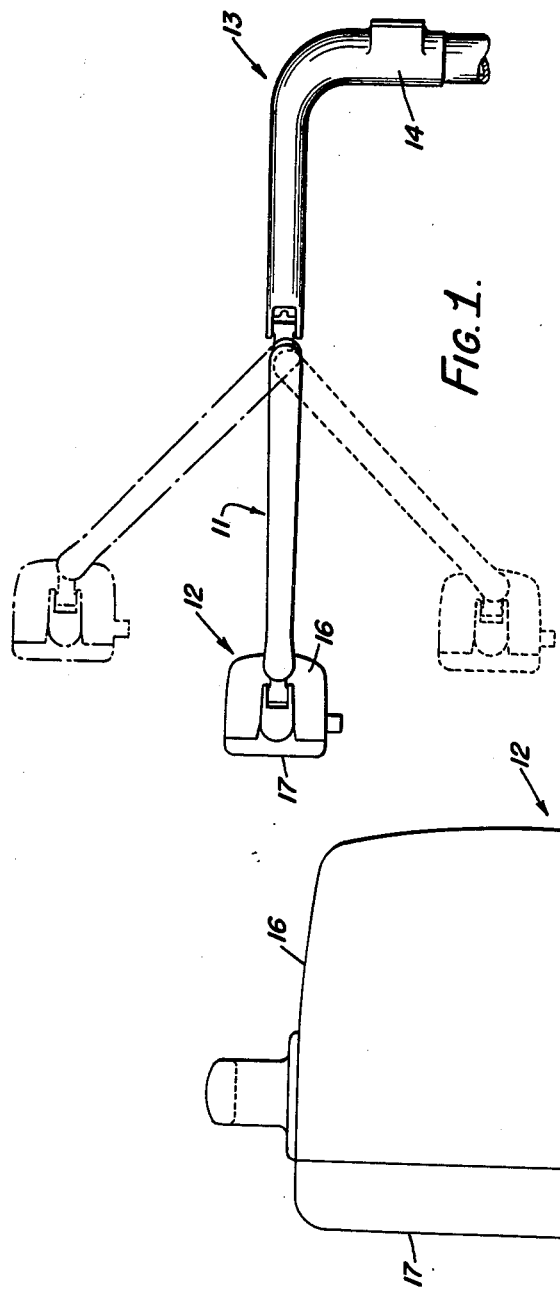
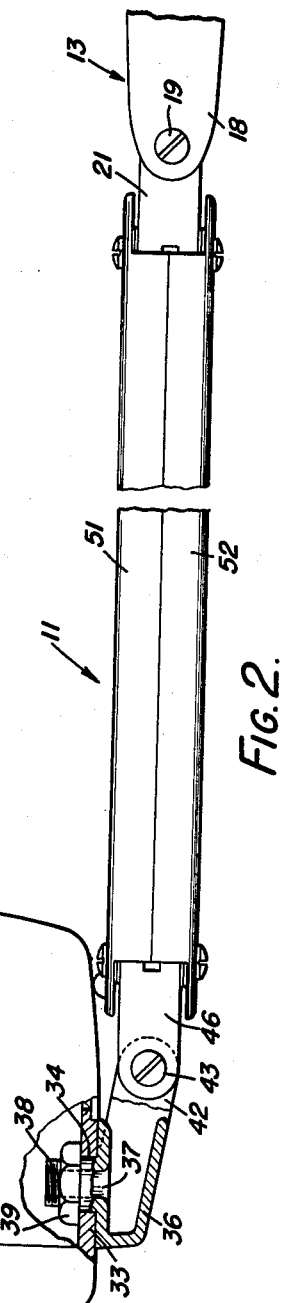
INVENTOR.
NORMAN E. LAUTERBACH
BY
ATTORNEY June 21, 1960
N. E. LAUTERBACH
2,941,776
COUNTERBALANCING MECHANISM
Filed May 13, 1957
7 Sheets-Sheet 2
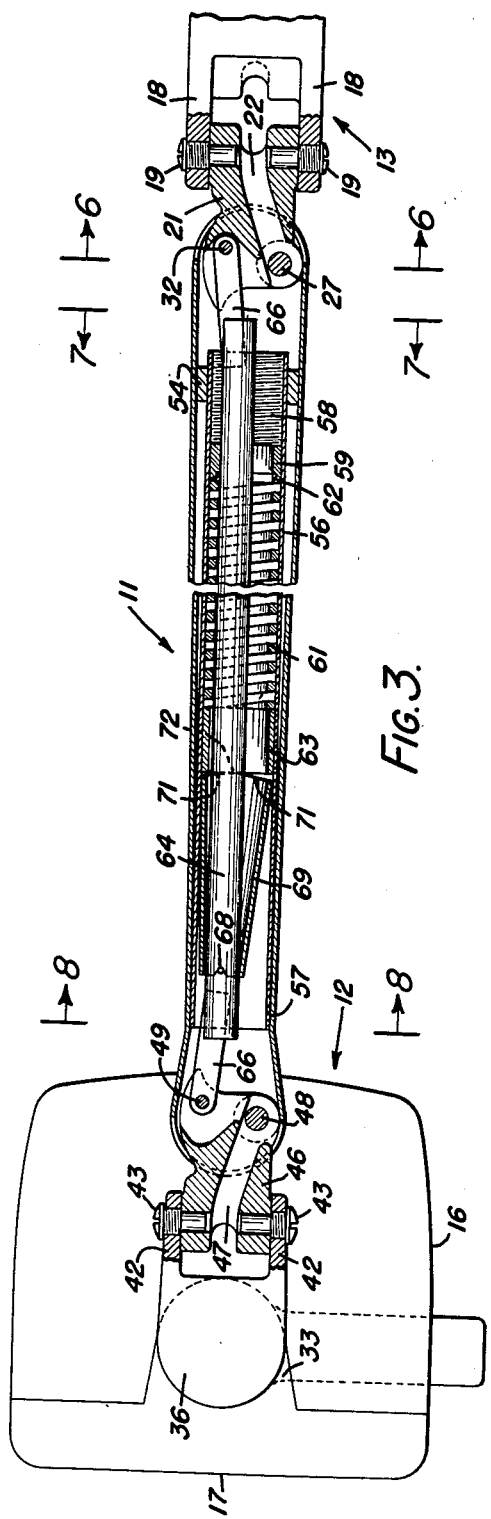
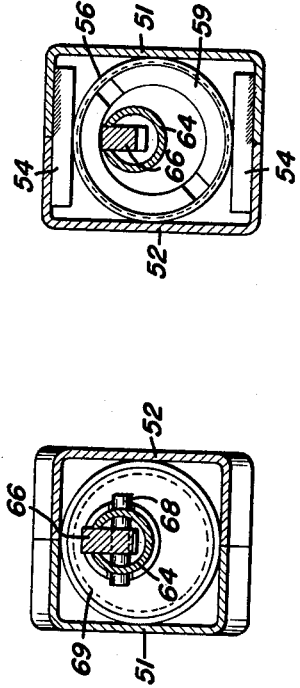
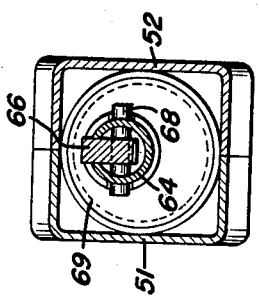
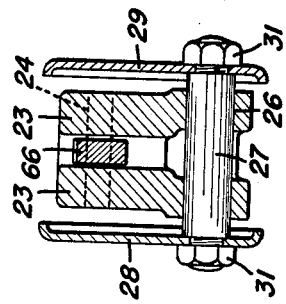
INVENTOR.
NORMAN E. LAUTERBACH
BY
ATTORNEY

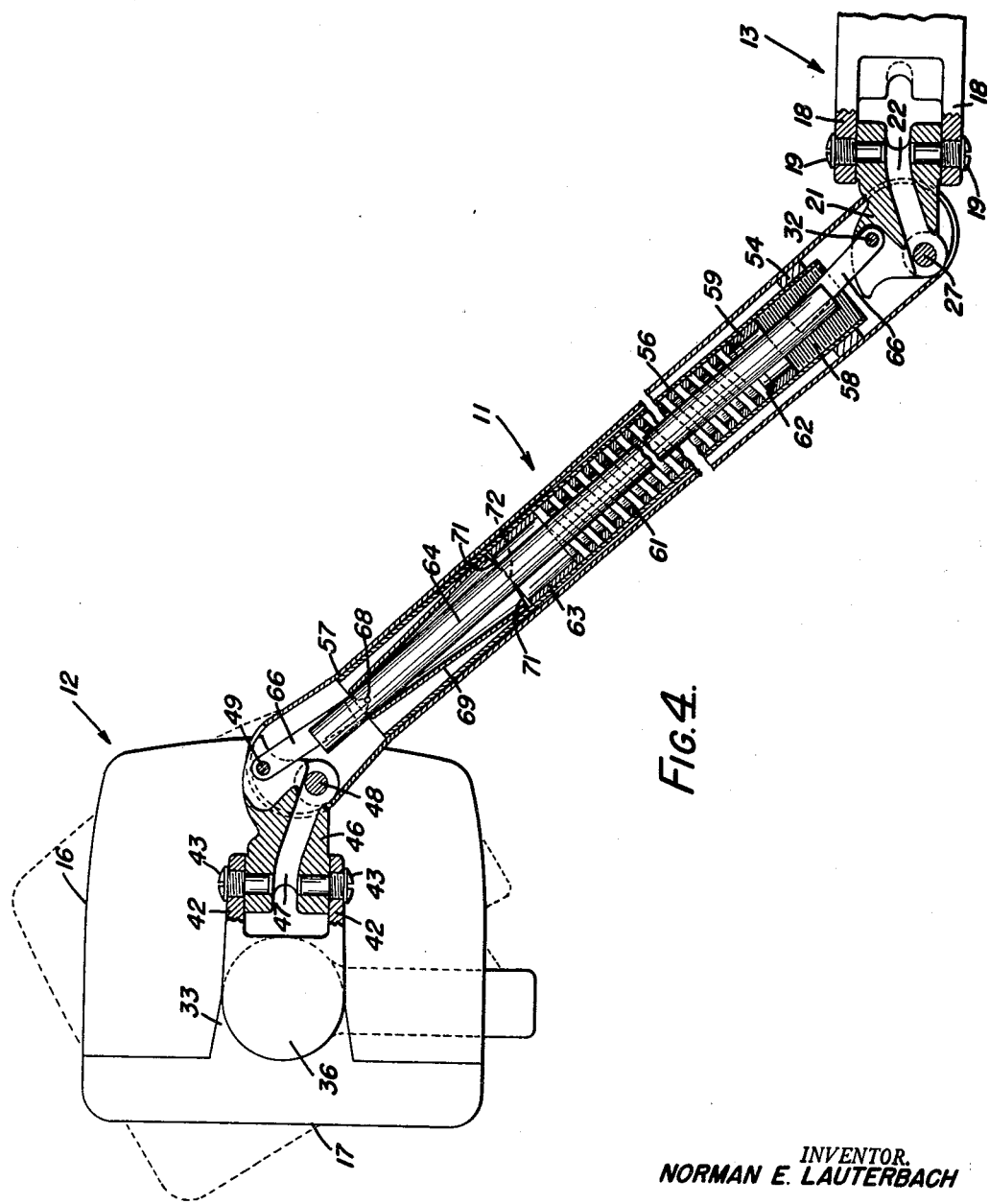

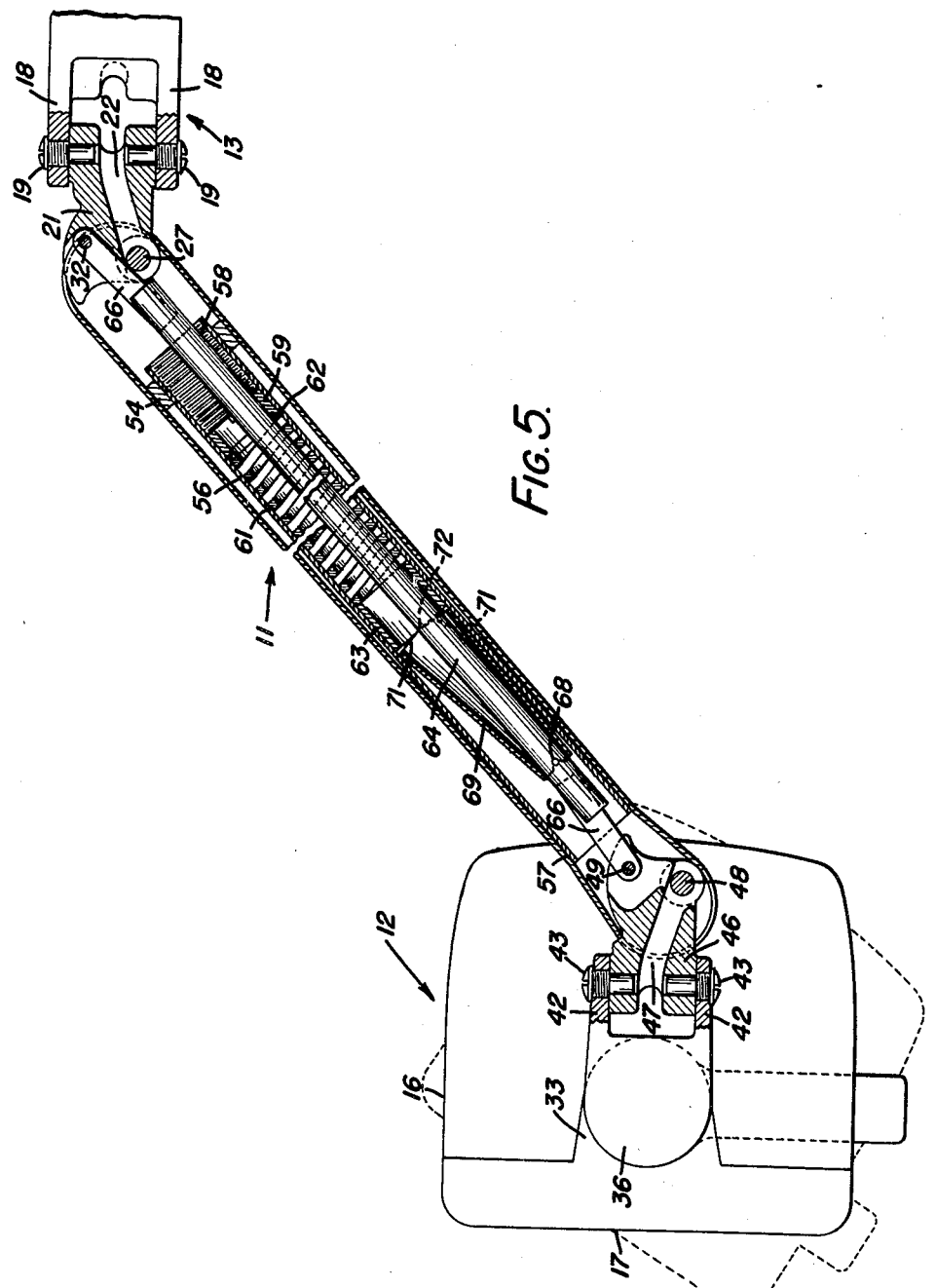

June 21, 1960  N. E. LAUTERBACH  2,941,776
COUNTERBALANCING MECHANISM
Filed May 13, 1957  7 Sheets-Sheet 5
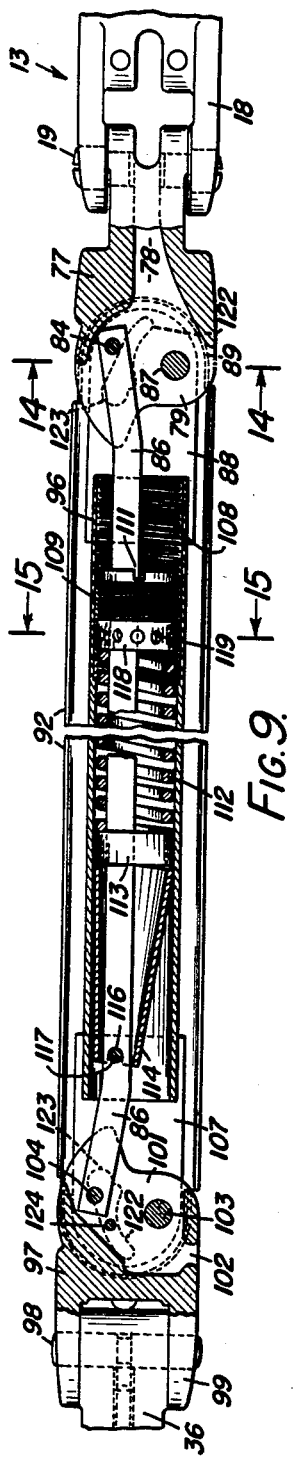
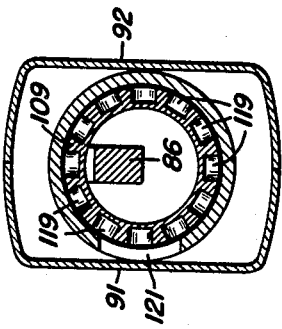
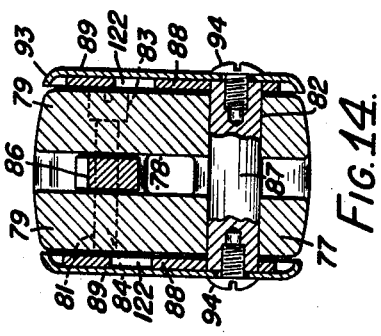
INVENTOR.
NORMAN E. LAUTERBACH
BY
ATTORNEY

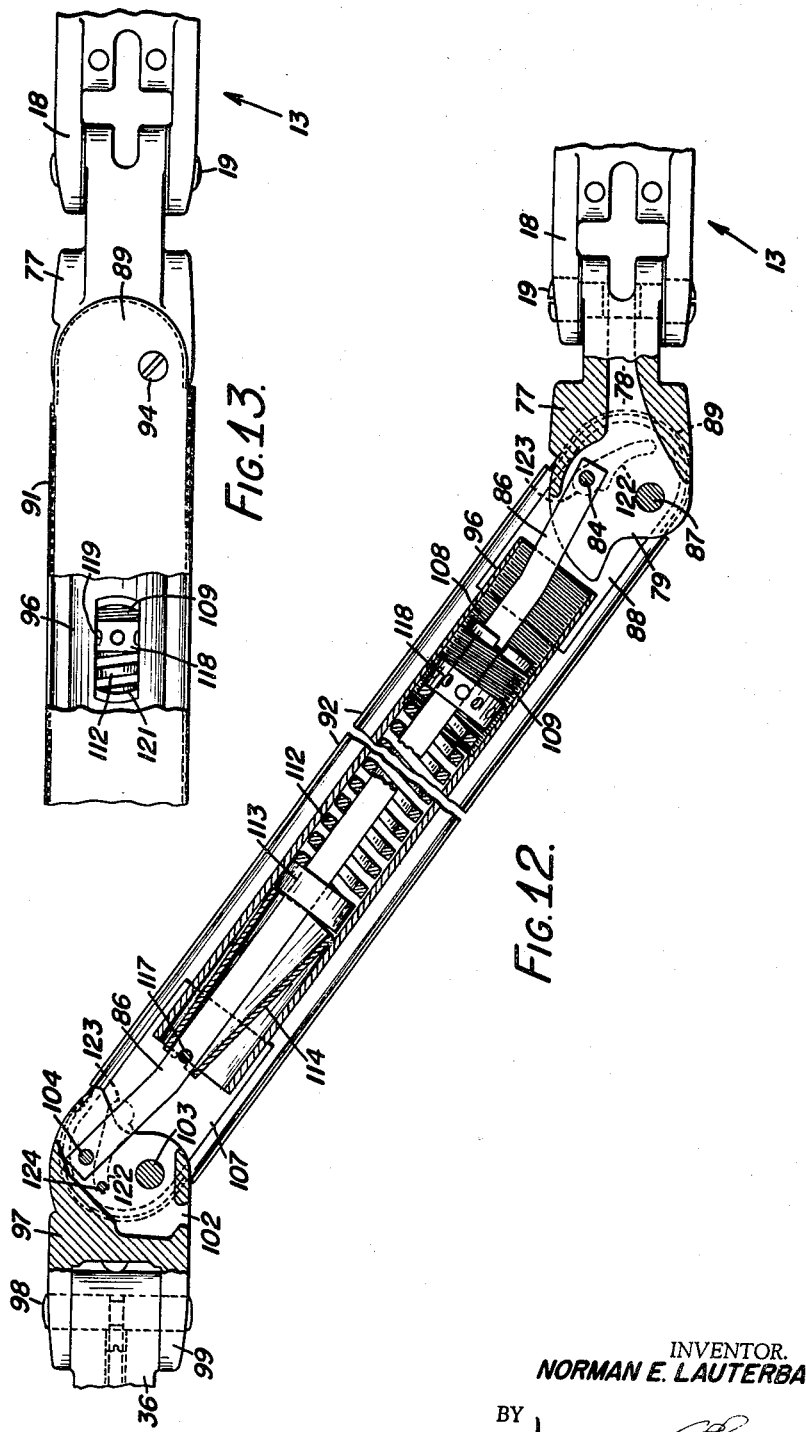

United States Patent Office 2,941,776
Patented June 21, 1960

2,941,776

COUNTERBALANCING MECHANISM

Norman E. Lauterbach, Pittsford, N.Y., assignor to Ritter Company, Inc., Rochester, N.Y., a corporation of Delaware Filed May 13, 1957, Ser. No. 661,273

15 Claims. (Cl. 248—284)

My invention relates to a counterbalancing mechanism or a mechanism for supporting an object in an adjusted position at any one of a number of different levels or positions. This application is a continuation in part of my copending application Serial No. 314,453, filed October 13, 1952 now abandoned.

While the counterbalancing mechanism of my invention may be used generally wherever the weight of an object is to be counterbalanced so that it will remain at a desired adjusted position and so that the user is required to exert little physical effort to shift the object from one adjusted position to another, it has been designed particularly for use where the appearance of the finished product is important and a light compact assembly is required.

The invention will be shown and described in connection with the counterbalancing of a dental lighting unit or spotlight adapted to direct a beam of intense illumination across the mouth of the patient. However, it will be understood that this is primarily for purposes of illustration, the counterbalancing mechanism having broad application wherever the object to be counterbalanced must be capable of being swung through a wide arc; where appearance is important; and where the counterbalancing mechanism must be or preferably should be completely enclosed in a compact assembly.

An object of my invention is to provide a parallel motion counterbalancing mechanism which is inexpensive to manufacture and may be conveniently assembled into a compact unit.

Another object of my invention is to provide a counterbalancing mechanism which retains an object in a desired adjusted position and which may be completely enclosed within a tubular housing which housing constitutes one link of a parallel motion linkage.

A still further object of the invention is to provide a new and novel counterbalancing mechanism in which the counterbalancing force may be readily adjusted over a wide range in an easy and rapid manner without disassembling the mechanism.

A further object of my invention is to provide a counterbalancing mechanism in which all the parts thereof may be approximately telescopically arranged within a slender housing which housing constitutes one link of a parallel motion linkage whereby an attractive compact unit may be provided suitable for use where appearance, compactness of assembly and light weight are desirable characteristics.

My invention further contemplates the provision of a parallel motion counterbalancing mechanism in which one link of the parallel motion linkage constitutes a housing for the remainder of the mechanism and the other link is enclosed by a compression spring mounted in the housing in such manner that it always maintains the link which it encloses under tension, the force of said spring being exerted on the spring enclosed link through a toggle to the end that sliding motion is eliminated and friction between the parts is minimized.

Other objects and advantages of my invention will be set forth in the claims and will be apparent from the following description, when taken in connection with the accompanying drawings, in which:

Fig. 1 is a view showing a dental lighting unit or spotlight, a counterbalancing arm for the spotlight and a support for the spotlight and counterbalancing arm which may be carried by a dental operating unit;

Fig. 2 is a top plan view of the dental operating light or spotlight with parts in section;

Fig. 3 is a view showing the counterbalancing arm and counterbalancing mechanism in vertical section with the counterbalancing arm substantially horizontal;

Fig. 4 is a view similar to Fig. 3 with the spotlight raised to substantially its uppermost position corresponding approximately to the dot and dash position of the parts shown in Fig. 1;

Fig. 5 is a view similar to Figs. 3 and 4 with the spotlight lowered to substantially its lowermost position corresponding substantially to the dotted line position shown in Fig. 1;

Fig. 6 is a sectional view taken substantially on the line 6—6 of Fig. 3 in the direction indicated by the arrows;

Fig. 7 is a sectional view taken substantially on the line 7—7 of Fig. 3 in the direction indicated by the arrows;

Fig. 8 is a sectional view taken sbstantially on the line 8—8 of Fig. 3 in the direction indicated by the arrows;

Fig. 9 is a view of a modification of the counterbalancing mechanism of the invention partially in section;

Fig. 10 is a plan view of the modification of Fig. 9;

Fig. 12 is a view, partially in section, of the modification of Fig. 1 shown in substantially its uppermost position;

Fig. 13 is a side view, partially broken away, of a portion of the modification of Fig. 9;

Fig. 14 is a sectional view taken substantially along line 14—14 of Fig. 9 in the direction of the arrows; and Fig. 15 is a sectional view taken substantially along line 15—15 of Fig. 9 in the direction of the arrows.

Figure 11:
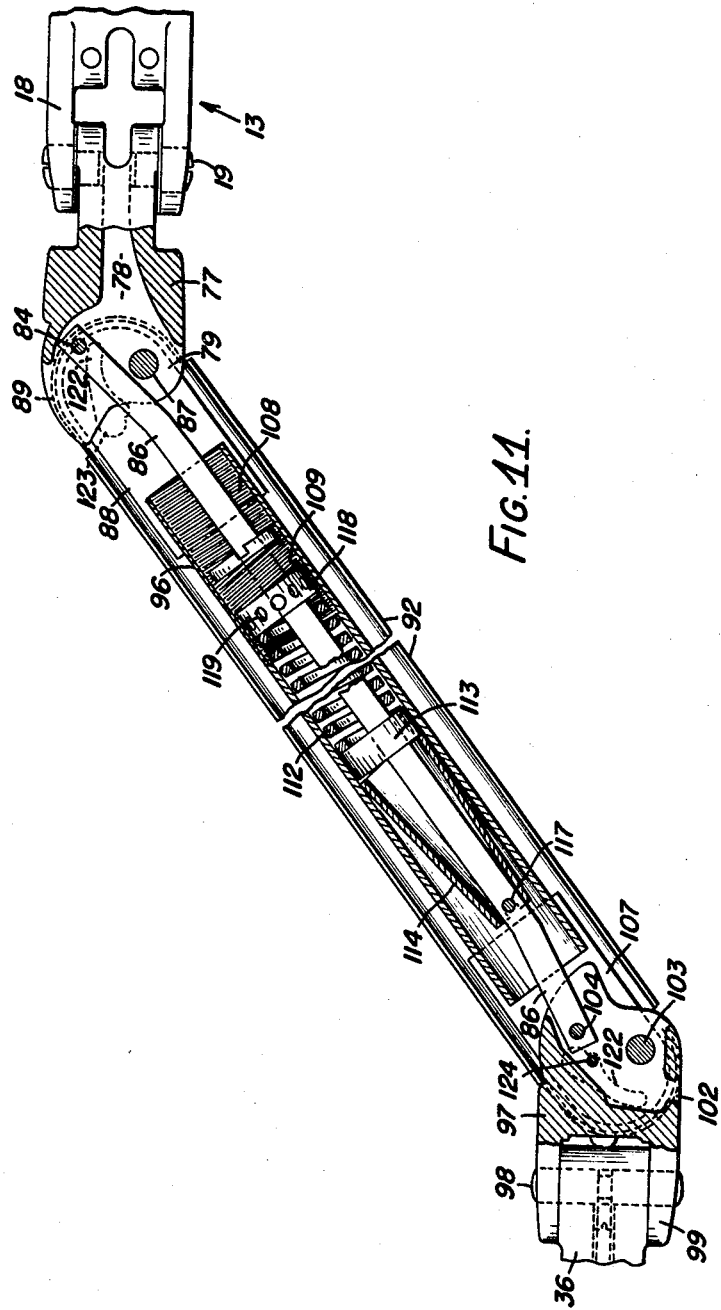
Fig. 11 is a side view, partially in section, of the modification of Fig. 9 shown in substantially its lowermost position.

While as previously mentioned, the parallel motion counterbalancing mechanism of my invention has general application, for purposes of illustration it will be shown and described in connection with the counterbalancing of a dental operating light or spotlight. In general, my invention may be employed wherever it is desirable to hold an object at any one of a number of different levels and maintain the object in a desired oriented position with respect to a plane.

The counterbalancing mechanism of my invention is incorporated in a unit which comprises a counterbalancing arm in which the counterbalancing mechanism is enclosed, generally indicated by the numeral 11, an object to be counterbalanced, in this case a dental lighting unit or spotlight, generally indicated by the numeral 12, and a support arm or bracket generally indicated by the numeral 13.

The support arm or bracket 13 constitutes no part of my present invention but in general comprises a bent or curved tubular member through which the wires for the lighting unit extend. The support arm or bracket may house a suitable transformer indicated at 14 and may be supported from a dental operating unit by means not shown.

The object to be counterbalanced in this case a dental operating light or spotlight, may include a housing 16 which encloses most of the elements of an optical system together with a suitable casting 17 which may carry a lens constituting part of the optical system and which closes the front opening of the housing 16. The housing may be provided with a handpiece to enable orientation of the spotlight beam as desired by the dentist and as presently will appear.

As shown most clearly in Figs. 3, 4 and 5, the free or extended end of the support arm or bracket 13 is bifurcated with the arms 18 extending horizontally. The arms 18 have threaded bores for the reception of screw trunnions 19 which extend vertically. The screw trunnions 19 extend into bores formed in a part or fixture 21 which carries the counterbalancing arm 11 and the lighting unit or spotlight 12. By means of the trunnion connection between the support arm or bracket 13 and the support fixture 21, the assembly of counterbalancing arm 11 and spotlight 12 may be swung about a vertical axis to orient the spotlight laterally with respect to the mouth of the patient.

The support fixture 21 has a through opening 22 through which the wires for the spotlight may extend as will presently appear. As shown most clearly in Fig. 6, the forward end of the support fixture 21 is bifurcated, providing arms 23 which are bored as indicated at 24 and 26. The bores 26 in the arms 23 are adapted to receive a pivot element 27. The pivot element is adapted to pivotally support two plates 28 and 29 which constitute respectively the rear and front walls of a housing for enclosing the operating parts of the counterbalancing mechanism as will presently appear. The plates 28 and 29 are held in position by threading the ends of the pivot element for the reception of nuts 31. The bores 24 in the arms 23 are adapted to receive a pivot pin 32 (Fig. 3), the function of which will later appear.

The casting 17 has a rearward extension 33 (Fig. 2) which is provided with a bore 34. A bracket hinge 36 has a hollow interior, a bore 37 and a threaded extension 38. The threaded extension 38 extends through the bore 34 and is adapted to receive a nut 39. There is thus provided an assembly which supports the casting 17 forming part of the housing of the spotlight. By the assembly shown the spotlight may be tilted about a horizontal axis whereby to tilt the spotlight upward or downward as illustrated in solid and dotted lines in Fig. 4. A spring washer (not shown) is interposed between the parts to frictionally support the spotlight in the desired adjusted position with respect to the horizontal axis. The wires for the spotlight extend through the hollow interior of the bracket hinge through the bores 37 and 34 and through a bore provided in the threaded end 38 of the bracket hinge 36.

The rearwardly extending end of the bracket hinge 36 is bifurcated so as to provide arms 42 which are bored for the reception of screw trunnions 43. The bracket hinge together with the spotlight supported thereby may be swung on the trunnions 43 about a vertical axis to orient the spotlight laterally with respect to the patient.

A spotlight support 46 is provided with bores for the reception of trunnions 43 and has a through opening 47 through which the wires for the spotlight extend. The spotlight support 46 is similar in construction to the support fixture 21 and is bifurcated for the reception of a pivot element 48 and a pivot pin 49.

The plates 28 and 29 merge into channel sections 51 and 52 (Fig. 2). The counterbalancing arm as thus constituted is a tube substantially rectangular in section. However, the tube may be cylindrical or any other desired shape. The advantage of the rectangular shape is that the wires (not shown) may lie in two of the corners of the rectangular structure formed. The channel section 51 carries the parts of the counterbalancing mechanism and the channel 52 constitutes a removable wall or cover plate which upon removal enables access to the counterbalancing mechanism. An important aspect of my invention lies in the fact that the channel 52 is removable without disturbing the operating mechanism which not only permits ease of assembly but also permits easy access to the operating parts for inspection, lubrication and repair.

The channel shaped sections 51 and 52 form a rectangular housing completely enclosing the counterbalancing mechanism. The housing formed by the channel sections further constitutes one link or arm of a parallel motion linkage as will presently appear. As shown in Figs. 3, 4 and 5, the rectangular housing preferably gradually decreases in cross-section from its rearward end to its forward end.

Brazed to the interior of the housing section 51 are supports 54. A cylindrical tube 56 is rigidly secured to the supports 54 by brazing or any other suitable means. The cylindrical tube 56 extends forwardly in the housing and is brazed to the housing section 51 at 57. The cylindrical tube is thus for all practical purposes a part of the housing section 51 and is free with respect to the housing section 52. The rearward end of the tube is threaded as shown at 58 for the reception of an adjustable nut 59. A spring 61 is housed within the tube 56 and one end thereof is backed up rigidly by the adjustable nut 59 between which and the spring, a washer 62 is interposed. The forward end of the spring presses against a guide sleeve 63 which is slidable in the tube 56. A further important aspect of my invention is the fact that I have provided a counterbalancing mechanism in which there is a compression spring instead of a tension spring. This fact is important for the reason that if a tension spring breaks its broken sections fly apart and may cause damage to other parts of the mechanism. A compression spring when it breaks collapses and is less likely to cause damage.

A tubular rod 64 extends through the tube 56 and the spring 61 and the ends thereof are slotted (Figs. 7 and 8) for the reception of extensions 66 which are welded or otherwise secured to the tubular rod 64. These extensions 66 are pivoted on the pivot pins 32 and 49. The rod 64 and its extensions 66 may be considered a straight link element and constitutes the second link of the parallel motion linkage. The purpose of the angularly extending extensions 66 is to enable the link comprised by 64—66 to shift angularly and occupy the smallest possible cross-sectional space.

As previously mentioned, the counterbalancing mechanism of my invention is compactly assembled and presents exteriorly a slim counterbalancing arm which is attractive in appearance. An important factor in enabling a compact assembly is the fact that one link, the link 64—66 of the parallel motion linkage is mounted within the counterbalancing spring 61 thereby decreasing the overall cross-sectional space required for the parts.

The tubular rod carries a pin 68 (Fig. 8) the ends of which are carried in notches formed in a conical element 69. The rearward end of the conical element has a base formed by two flat sections 71 which extend angularly with respect to each other to form a peak 72 between them against which the guide sleeve 63 bears. The conical element 69 together with its bearing peak 72 against the guide sleeve and the pin 68 with its slotted connection with respect to the conical element 69 constitutes a toggle, the purpose of which will presently appear.

It will now be understood that the spring 61 has one end fixed by the adjustable nut 59 which is usually adjusted, in the embodiment of Figs. 1–8 at the factory to give the proper compression of the spring. The other end of the spring bears against the sleeve and through the toggle exerts pressure on the link 64—66 so that this link is always in tension.

Upon reference to Fig. 5, the action of the counterbalancing mechanism will be more clear. The pivot points 27 and 48 are fixed in all positions of the counterbalancing arm shown in Figs. 1, 3, 4 and 5. Tensioning of the link 64—66 exerts a force on the pivot pin 49 tending to rotate it in a counterclockwise direction around the pivot 48. The force is transmitted from the pivot pin 48 through the housing 51—52 to the pivot pin 27 and causes an upward force on the housing 51 and 52 tending to rotate it in a clockwise direction about the pivot 27. This force is present in all angular positions of the counterbalancing arm with respect to the support bracket 21. Thus the pressure of the spring 61 always tends to rotate the counterbalancing arm together with the spotlight, in a clockwise direction about the pivot 27. By applying the proper pressure on the spring through the adjusting nut 59, the weight of the spotlight may be counterbalanced in all possible positions thereof.

As the arm swings upwardly the center of gravity of the moving parts and the effective length of the lever arm changes. The effective length of the lever arm increases as the spotlight moves from the position of Fig. 5 to that of Fig. 3 and decreases from the position of Fig. 3 to that of Fig. 4. However, by properly locating the pivot points and applying the proper pressure on the spring and considering the friction between the parts, the arrangement may be made such as to counterbalance the spotlight in any position thereof as illustrated in Figs. 3, 4 and 5 and when in the position desired the spotlight will remain in that desired adjusted position. Only a slight force must be exerted by the dentist to move the spotlight from one position to another.

The purpose of the toggle comprising the element 69, the toggle pin 68 and the pressure peak 72 is to avoid sliding motion which greatly increases friction. This would necessitate the use of higher pressure spring 61 and increase the physical effort required to shift the spotlight. It will be understood by a comparison of Figs. 3, 4 and 5 that when the counterbalancing arm is in the horizontal position shown in Fig. 3, the cone 69 is in its uppermost position; when the counterbalancing arm is in the position shown in Fig. 4, the cone is in an approximately central position; and when the counterbalancing arm is in the position shown in Fig. 5, the cone 69 is in its lowermost position. Thus the force of the spring is transmitted to the link 64—66 through the rotational movement at the toggle pin 68 and rocking movement about the pressure peak 72. Without this toggle arrangement, sliding movement of the parts would be required. Moreover, the pressure on the guide sleeve 63 would be angular for most positions of the parts which would tend to cock the guide sleeve and the spring in the tubular member 56.

By a comparison of Figs. 3, 4 and 5 it will be understood that when the parts are in the position shown in Fig. 3 the torque exerted by the weight of the spotlight is greatest tending to rotate the counterbalancing arm counterclockwise about pivot 27. Consequently in this approximate position the partially compressed spring is using its most effective leverage toward supporting the weight of the spotlight. Now, as the arm is moved from the position shown in Fig. 3 toward that shown in Fig. 4 the supporting requirement decreases due to a shortened effective arm length. This decreased requirement is met by a weakening of the spring due to its expansion, along with a less effective leverage advantage. However, when the spotlight is moved from the position shown in Fig. 3 toward the position shown in Fig. 5, it can be seen that although there is a decreasing requirement for supporting the spotlight, due to a shortened effective arm length, there occurs in this movement an increase in the compression of the spring. To partially nullify an increasing supporting energy of the spring in this part of the arm movement you will note that I have offset the upper pivots 32 and 49 in their relation to lower pivots 27 and 48 respectively. This causes the arm to produce a progressively weakening support for the spotlight due to the accelerated shortening of the effective lever against which the spring is working to support the load. In this way an essentially uniform lifting force is obtained at all positions of the desired arc of travel.

It can be seen that in the embodiment of Figs. 1–8, the initial setting of nut 59 generally made at the factory, except with difficulty, cannot be changed without disassembly when the counterbalancing mechanism has been installed. In some installations, where the supported object 12 is replaced with an object of different weight, considerable difficulty would be involved in disassembling the mechanism to alter the counterbalancing force. Furthermore, the operator may wish to change the counterbalancing force from time to time for his own convenience. Moreover, in the arrangement of Figs. 1–8 inclusive only one of the cover parts is removable.

Therefore a modification of the counterbalancing mechanism of the invention is shown in Figs. 9–15 which incorporates means to adjust the counterbalancing force more conveniently when the unit has been assembled in the operating position without disassembling the mechanism. Like numerals have been used to designate like parts in this modification.

As shown in Fig. 9, the arms 18 on the support bracket 13 are provided with threaded bores for the reception of the screw trunnions 19 so as to pivotally secure to the support bracket a support fixture 77. The fixture 77 is provided with a centrally arranged passage 78 through which the electrical conductors (not shown) for the supported unit 12 may extend.

As shown best in Figs. 10, 14, the fixture 77 is bifurcated to provide a pair of arms 79 which are bored as indicated at 81, 82. One of the bores 81 is countersunk as indicated at 83 to accommodate the slotted head of a pivot pin 84 so that the pin lies flush with the outer surface of the arms 79. The pin 84 is preferably threadedly engaged with the bores 81 and is arranged to pivotally support one end of a link 86 which extends within the fixture arms 79 as shown in Fig. 14.

The bores 82 accommodate a pivot element 87 which is adapted at each end to pivotally support a pair of spaced parallel plates 88 and the circular end portions 89 of a pair of cooperating channel members 91, 92 which form a rectangular housing for the counterbalancing mechanism throughout substantially their entire length. It will be noted in Fig. 14 that a peripheral flange or lap 93 is formed on the marginal edge of end portions 89 so as to enclose the space formed by the plates 88. The channel members 91, 92 are secured to the pivot element 87 by means such as screws 94 as shown best in Fig. 14 and the other end of the plates 88 are secured by means such as brazing to one end of a cylindrical member 96 extending coaxially within the housing formed by the channel or housing members 91, 92.

At the other end of the counterbalancing mechanism, a spotlight support or fixture 97 is pivotally secured to the bracket hinge 36 by means of screw trunnions 98 inserted within suitable bores in arms 99 located at one end of the fixture.

As shown in Fig. 9, the support 97 is bifurcated at its other end to provide a pair of rearwardly extending arms 101 in a manner similar to the fixture 77. The support 97 is also provided with a through passage 102 through which the electrical conductors for the spotlight 12 may pass.

The arms 101 are suitably bored to accommodate a pivot element 103 and a pivot pin 104 the latter of which is secured to the other end of the link 86 opposite pin 81 as shown in Fig. 10. The channel or housing members 91, 92 are secured to the pivot element 103 by means of screws 106. A second pair of spaced plates 107 similar to the plates 88 are pivoted on the pins 103. The plates 107 are also secured by suitable means such as brazing to the end of the centrally arranged cylindrical member so that the member 96 is supported in the housing defined by channels 91 and 92 by means of the plates 88, 107. It will be noted that the link 86 extends within the member 96.

Thus, the housing formed by the channel members 91, 92 completely enclose the counterbalancing mechanism as in the previous embodiment to give an attractive and neat outward appearance. Further, the flanged end portions 89 of the channels blend the housing with the fixtures 77, 97 while permitting a full range of movement.

As described in the embodiment of Figs. 1–8, the sleeve 96 is threaded at 108 to accommodate an adjusting nut 109 slotted at 111 against which one end of a compression spring 112 is positioned. The compression spring produces the counterbalancing force and has its other end pressed against a freely movable sleeve 113 the other side of which is in contact with a conical element 114 similar to the conical element 69 of the first embodiment. The narrow end of the element 114 is recessed at 116 to accommodate the fixed pin 117 on the link 86 to define a toggle.

As has been previously explained, the nut 109 is provided with a slot 111 by which it may be initially moved to an adjusted axial position before assembly of the counter-balancing mechanism so as to predetermined the compression of the spring 112.

It will be understood, however, that once the assembly of the counterbalancing mechanism has been made, easy access to the slot 111 is no longer possible and therefore means have been provided whereby the axial position of nut 109 may be adjusted in a simple and rapid manner. More specifically, as shown in Figs. 9, 13, the nut 109 is provided with an unthreaded portion 118 which contains a plurality of spaced recesses 119 around its outer periphery. The recessess 119 are arranged to accommodate a suitable tool, such as a pin wrench for rotating the nut.

In order to provide access to the nut recesses 119, the sleeve 96 is cut away to provide a lateral opening 121 (Fig. 13) which exposes an arcuate segment of the nut over a wide range of axial positions. Thus, with this construction, it is a relatively simple matter to detach the housing channel member 91 by removing the screws 94, 106 and with the insertion of a suitable tool such as a pin wrench through the opening 121 in the sleeve move the nut 114 to a selected axial position. As the compression of the spring 112 is determined by the axial position of the nut 109, the counterbalancing force may therefore be adjusted to the desired level. It can be seen that this adjustment operation is simply and quickly carried out and the member 91 easily removed and replaced without the need for elaborate and time consuming operation.

It is desirable to limit the movement of the counterbalancing mechanism for proper operation and to avoid damaging the various components. Means therefore have been provided to establish maximum and minimum limits for the vertical movement of the mechanism 76.

Each of the plates 88, 107 is provided with a substantially arcuate slot 122 terminating at one end in an enlarged portion 123. While the slots 122 in each pair of plates are in alignment directionally, the enlarged portions 123 on opposite plates extend inwardly of the counterbalancing mechanism in opposed relationship. A pair of limit pins 124 are positioned on the arms 101 of fixture 97 so as to extend laterally outward on each side thereof and of such a length as to lie with the arcuate slot 122 in the plates 107.

It can be understood, therefore, that when the counterbalancing mechanism is moved vertically the pin 124 will travel within the slots 122 and in the lowermost position of the pin engages one of the marginal ends of the slots as shown in Fig. 11. In the uppermost position (Fig. 12) the pin 124 engages the opposite end of the arcuate slot 122.

It can be seen that as the counterbalancing mechanism is moved within its vertical limits the heads of the pivot pins 81, 104 will sweep past the enlarged portions 123 on the slots 122. In Fig. 12, the head of pin 81 is shown accessible through the enlarged portion 123 in one of the plates 88 in the uppermost position of the mechanism. By means of the slot portions 123, the pivot pins 81, 107 may be removed and the link 86 disconnected from the fixtures 77, 97. Thus assembly and disassembly of the mechanism is facilitated. It should further be understood that a single guide pin 124 only has been shown on the fixture 97, since the unitary counterbalancing mechanism would require only a single limiting device. It should be understood, however, that two pins rather than a single pin may be employed if desired.

It can be seen that on the plates 88 only the enlarged portion 123 of slot 122 is used and the remainder of the slot could be eliminated. However, economy of manufacture makes it more feasible to fabricate the slots 122 in the plates with a single die so the entire slot 122 has been shown.

It will be apparent that I have provided a relatively simple counterbalancing mechanism which may be housed within a minimum of space and entirely enclosed with the parts substantially telescopically arranged with respect to each other. The counterbalancing arm may therefore be attractive in appearance externally and the elements of the counterbalancing mechanism may be completely enclosed. A major difference between the two embodiments shown lies in the fact that in the embodiment of Figs. 1 to 8 inclusive one of the cover or housing parts is part of one of the links of the counterbalancing mechanism; in the embodiment of Figs. 9 to 15 inclusive the counterbalancing mechanism is a separate unit to which the channel members 91, 92 forming the housing are applied.

While I have shown the preferred embodiment of my invention, it will be apparent that various modifications and changes may be made therein, particularly in the form and relation of parts without departing from the spirit of my invention.

I claim:

1. Counterbalancing mechanism for an object the weight of which is to be counterbalanced comprising, in combination, a two part tubular body, one of said parts constituting one link of a parallel motion linkage and the other part being a cover and being fitted to and separable from the link part to enable access to the interior of the tubular body, a second parallel motion link mounted inside said tubular body, support fixtures for said counterbalancing mechanism and the object adjacent the ends of the link part of the tubular body and said second link, pivot connections between said support fixtures and said link part and said second link and a compression spring enclosed within said tubular body surrounding said second link and means for acting between said tubular body, said second link and said spring for maintaining said second link in tension in all possible positions of the object to be counterbalanced.

2. Counterbalancing mechanism in accordance with claim 1 in which a cylindrical member is fixed within and with respect to the link part of said tubular body and encloses the spring and the second link.

3. Counterbalancing mechanism in accordance with claim 1 in which a further support is fixed to the link part of said tubular body and a member is positioned within the link part and forms a seat for one end of the spring, said member being adjustable with respect to said further support to change the compression of the spring, the mechanism further including a slidable member upon which the other end of the spring bears, and a toggle is interposed between the slidable member and said second link through which the force of the spring exerted on said slidable member is transmitted to said second link.

4. Counterbalancing mechanism in accordance with claim 1 in which a cylindrical member is fixed within and with respect to the link part of said tubular body and is provided with a threaded end, an adjustable nut threaded into said threaded end and one end of said spring being seated on said nut, a sleeve slidable in said tubular body upon which the other end of the spring is seated and a toggle interposed between said sleeve and said second link through which the force of said spring is exerted on said second link.

5. Counterbalancing mechanism for an object the weight of which is to be counterbalanced comprising, in combination, a two part tubular body, one of said parts constituting one link of a parallel motion linkage and the other part being a cover and being fitted to and separable from the first part to enable access to the interior of the tubular body, a second parallel motion link mounted inside said tubular body, support fixtures for said counterbalancing mechanism and the object adjacent the ends of said tubular body and the ends of said second link, pivoted connections between said support fixtures and said links, a spring enclosed within the tubular body, a member within the tubular body and in fixed relation to the link part forming a seat for one end of the spring, an additional member within said tubular body and connected with said spring and said second link through which the pressure of said spring is exerted on said second link.

6. Counterbalancing mechanism for an object the weight of which is to be counterbalanced comprising, in combination, a support for said counterbalancing mechanism and a support for the object to be counterbalanced, a pair of parallel motion links, a plurality of pivots for pivotally connecting said links to said supports, means including a spring applying a counterbalancing pressure to said links and means comprising at least two removable covers enclosing said parallel motion links and said spring whereby upon removal of said covers the parallel motion links and spring are accessible for adjustment and repair.

7. Counterbalancing mechanism in accordance with claim 6 in which said covers are attached by attaching means to two of said pivots and said attaching means may be removed to enable removal of the covers without disturbing the functioning of said counterbalancing mechanism.

8. Counterbalancing mechanism for an object the weight of which is to be counterbalanced comprising, in combination, a support for said counterbalancing mechanism and a support for the object to be counterbalanced, a pair of parallel motion links, a plurality of pivots pivotally connecting said links to said supports, means including a spring having spring pressure adjusting means applying a counterbalancing pressure to said links, one of said links comprising a tubular member enclosing said spring, means connecting said tubular member at each end to one of said pivots, means comprising at least two removable covers enclosing said parallel motion links and said spring whereby upon removal of said covers the parallel motion links are exposed and means enabling access to the spring pressure adjusting means upon removal of said covers.

9. Counterbalancing mechanism for an object the weight of which is to be counterbalanced comprising, in combination, a support for said counterbalancing mechanism and a support for the object to be counterbalanced, a tubular member, a pair of parallel motion links each of which is pivotally connected at both ends to said supports, one of said parallel motion links including said tubular member, said other parallel motion link extending through said tubular member, a spring mounted in said tubular member, one end of which applies pressure to one of said parallel motion links, an adjusting nut against which the other end of said spring seats, said nut being threaded with respect to said tubular member and a cover enclosing said spring, tubular member and parallel motion links, at least a part of said cover being removable to enable access to said adjusting nut.

10. A counterbalancing mechanism for an object the weight of which is to be counterbalanced, said mechanism comprising, in combination, a support for said counterbalancing mechanism and a support for the object to be counterbalanced, a pair of parallel motion links movably connecting said supports, a plurality of pivots pivotally connecting said links to said supports, a spring operatively associated with said links applying a counterbalancing pressure thereto, one of said links comprising a tubular member, and means at each end connecting said tubular member to one of said pivots, each of said connecting means including a pair of spaced support plates secured to one end of said tubular member.

11. Counterbalancing mechanism for an object the weight of which is to be counterbalanced comprising, in combination, a support for said counterbalancing mechanism and a support for the object to be counterbalanced, a pair of parallel motion links movably connecting said supports, a plurality of pivots pivotally connecting said links to said supports, a spring operatively associated with said links applying a counterbalancing pressure thereto, one of said links comprising a tubular member, means connecting said tubular member at each end to one of said pivots, a housing enclosing said tubular member, an adjusting nut in said tubular member for adjusting the counterbalancing force on said spring, said tubular member having an aperture to permit access to said nut upon removal of the housing.

12. A counterbalancing mechanism for an object the weight of which is to be counterbalanced comprising, in combination, a support for said counterbalancing mechanism and a support for the object to be counterbalanced, a pair of parallel motion links, a plurality of pivots pivotally connecting said links to said supports, one of said links including a tubular member, a spring enclosed by said tubular member, an adjustable nut for varying the pressure of said spring threaded with respect to said tubular member and upon which the spring seats, and means applying the pressure of said spring on said other link.

13. A counterbalancing mechanism in accordance with claim 12 in which said other link extends through the spring and tubular member.

14. A counterbalancing mechanism for an object the weight of which is to be counterbalanced comprising, in combination, a support for said counterbalancing mechanism and a support for the object to be counterbalanced, a pair of parallel motion links, a plurality of pivots pivotally connecting said links to said supports, means including a spring applying pressure between said links in a direction such that the pressure of the spring counterbalances the weight of the object, means for adjusting the pressure of said spring, and a cover enclosing said mechanism including the spring and the adjusting means therefor whereby upon removal of at least part of the cover access may be had to said mechanism and adjustment of said spring pressure adjusting means may be accomplished with the mechanism functioning normally.

15. A counterbalancing mechanism in accordance with claim 14 in which the cover is attached to and detachable from the pivots of one of said links.

References Cited in the file of this patent

UNITED STATES PATENTS

| 808,983 | Hollowell | Jan. 2, 1906 |
| 906,874 | Hollowell | Dec. 15, 1908 |
| 1,078,577 | Fox | Nov. 11, 1913 |
| 2,287,577 | Stava | June 23, 1942 |

FOREIGN PATENTS

| 551,290 | Great Britain | Feb. 16, 1943 |
| 629,364 | Great Britain | Sept. 19, 1949 |